(12) United States Patent
Sørensen et al.

(10) Patent No.: US 7,344,766 B1
(45) Date of Patent: Mar. 18, 2008

(54) INJECTION-MOULDED STOPPER FOR MEDICAL CONTAINERS

(75) Inventors: Anne Sørensen, Holte (DK); Thomas Buch-Rasmussen, Gentofte (DK); Ulrik Nøsted, København (DK)

(73) Assignee: Novo Nordisk A/S, Bagsvaerd (DK)

( * ) Notice: Subject to any disclaimer, the term of this patent is extended or adjusted under 35 U.S.C. 154(b) by 0 days.

(21) Appl. No.: 09/577,694

(22) Filed: May 22, 2000

(30) Foreign Application Priority Data

May 28, 1999 (DK) ................ 1999 00756

(51) Int. Cl.
*B65D 39/00* (2006.01)
(52) U.S. Cl. ...................... 428/35.7; 215/355
(58) Field of Classification Search ............ 428/35.7; 215/247, 355
See application file for complete search history.

(56) References Cited

U.S. PATENT DOCUMENTS

| | | | | |
|---|---|---|---|---|
| 2,507,680 A | * | 5/1950 | Rheude | 215/303 |
| 2,556,297 A | * | 6/1951 | Rheude | 215/316 |
| 3,430,777 A | * | 3/1969 | Esposito, Jr. | 215/256 |
| 4,444,330 A | | 4/1984 | Kasai et al. | 215/247 |
| 4,664,275 A | * | 5/1987 | Kasai et al. | 215/247 |
| 4,682,703 A | * | 7/1987 | Kasai et al. | 215/247 |
| 5,060,659 A | * | 10/1991 | Cook et al. | 128/764 |

FOREIGN PATENT DOCUMENTS

| | | |
|---|---|---|
| EP | 0215551 B1 | 7/1986 |
| EP | 0841374 A2 | 11/1997 |

OTHER PUBLICATIONS

Baxter Rubber Company, Butyl Data Sheet, Copyright 1996-1998.*

* cited by examiner

*Primary Examiner*—Rena Dye
*Assistant Examiner*—Sow-Fun Hon
(74) *Attorney, Agent, or Firm*—Wesley A. Nicolas; Marc A. Began

(57) ABSTRACT

The present invention relates to the field of pharmaceutical packaging. More specifically the present invention relates to a stopper made from a thermoplastic elastomer for the use in medical containers.

16 Claims, 13 Drawing Sheets

INJECTION-MOULDED STOPPER FOR MEDICAL CONTAINERS

The present invention relates to the field of pharmaceutical packaging. More specifically the present invention relates to a stopper made from a thermoplastic elastomer for the use in medical containers.

BACKGROUND OF THE INVENTION

The successful storage of medical solutions in containers is dependent upon a variety of factors all relying on the type of material chosen for the packaging. In order to qualify for the use in pharmaceutical packaging the material must possess good barrier and leaking properties. The material must have a high barrier against preservatives from the medical solution and at the same time liberate as few leakage substances to the medical solution as possible.

In the prior art such material has been described as bromobutyl (halogenated butyl rubber). EP 841 374 discloses a moulded bromobutyl rubber part suitable for being in contact with medical solutions. The rubber part is moulded by the means of vulcanisation and contains a fine powder of ultra-high-molecular-weight polyethylene.

An important aspect in the research field of pharmaceutical packaging is to continuously improve the materials for holding pharmaceuticals. The emphasis of this research is particularly relevant in relation to obtaining satisfactory leakage properties. Another and more appropriate material for the above purpose is described in EP 215 551 as a mixture of bromobutyl and polypropylene (PP). EP 215 551 discloses a high temperature creep resistant thermoplastic elastomer composition for the use in rubber parts, such as stoppers for syringes. The composition comprises vulcanised ethylene-propylene-diene terpolymers and polypropylene with butyl based rubber, the latter being present in small amounts with respect to the polypropylene.

For the purpose of manufacturing medical containers injection-mouldable compositions have proved to be advantageous. U.S. Pat. No. 444,330 discloses a stopper for a medical container made from an injection-mouldable polymeric material containing a blend of a butyl-based rubber, a thermoplastic elastomer and a mouldability improving olefin-based polymer.

It is the object of the present invention to provide a stopper material suitable for use in pharmaceutical packaging having reduced leakage.

SUMMARY OF THE INVENTION

The present invention relates to a stopper comprising a butyl based rubber and another stopper component, wherein the combination of the butyl based rubber and the other stopper component results in a reduced leakage of substances compared to the leakage of substances from a stopper made from a butyl based rubber alone.

According to the present invention the use of the stopper is for medical containers.

Another aspect of the present invention is a medical container for storing a liquid medicament, comprising a distal and a proximal end portion and at least one wall defining an interior space for such liquid medicament, wherein one of the end portions comprises a stopper as defined by the invention.

The present invention further relates to a process of producing a stopper, comprising the following steps of:

heating a butyl based rubber and melting a thermoplastic polymer,
homogenising the stopper material,
moulding the stopper material by injection moulding and obtaining the stopper.

DRAWINGS

FIG. 1 is a chromatogram showing the spectrum for an insulin solution at a wavelength of 214 nm. The solution was stored in a medical container with a bromobutyl stopper prior to analysis. A illustrates the insulin peaks and B illustrates peaks of other substances that have leaked from the stopper.

FIG. 2 is a chromatogram showing the spectrum for an insulin solution at a wavelength of 240 nm. The solution was stored in a medical container with a bromobutyl stopper prior to analysis. B illustrates peaks of other substances than insulin that have leaked from the stopper.

FIG. 3 is a chromatogram showing the spectrum for an insulin solution at a wavelength of 265 nm. The solution was stored in a medical container with a bromobutyl stopper prior to analysis. B illustrates peaks of other substances than insulin that have leaked from the stopper.

FIG. 4 is a chromatogram showing the spectrum for an insulin solution at a wavelength of 280 nm. The solution was stored in a medical container with a bromobutyl stopper prior to analysis. B illustrates peaks of other substances than insulin that have leaked from the stopper.

FIG. 5 is a chromatogram showing the spectrum for an insulin solution at a wavelength of 214 nm. The solution was stored in a medical container with a stopper according to the invention prior to analysis. A illustrates the insulin peaks and B illustrates peaks of other substances.

FIG. 6 is a chromatogram showing the spectrum for an insulin solution at a wavelength of 240 nm. The solution was stored in a medical container with a stopper according to the invention prior to analysis. B illustrates peaks of other substances than insulin.

FIG. 7 is a chromatogram showing the spectrum for an insulin solution at a wavelength of 265 nm. The solution was stored in a medical container with a stopper according to the invention prior to analysis. B illustrates peaks of other substances than insulin.

FIG. 8 is a chromatogram showing the spectrum for an insulin solution at a wavelength of 280 nm. The solution was stored in a medical container with a stopper according to the invention prior to analysis. B illustrates peaks of other substances than insulin.

Figure 12:
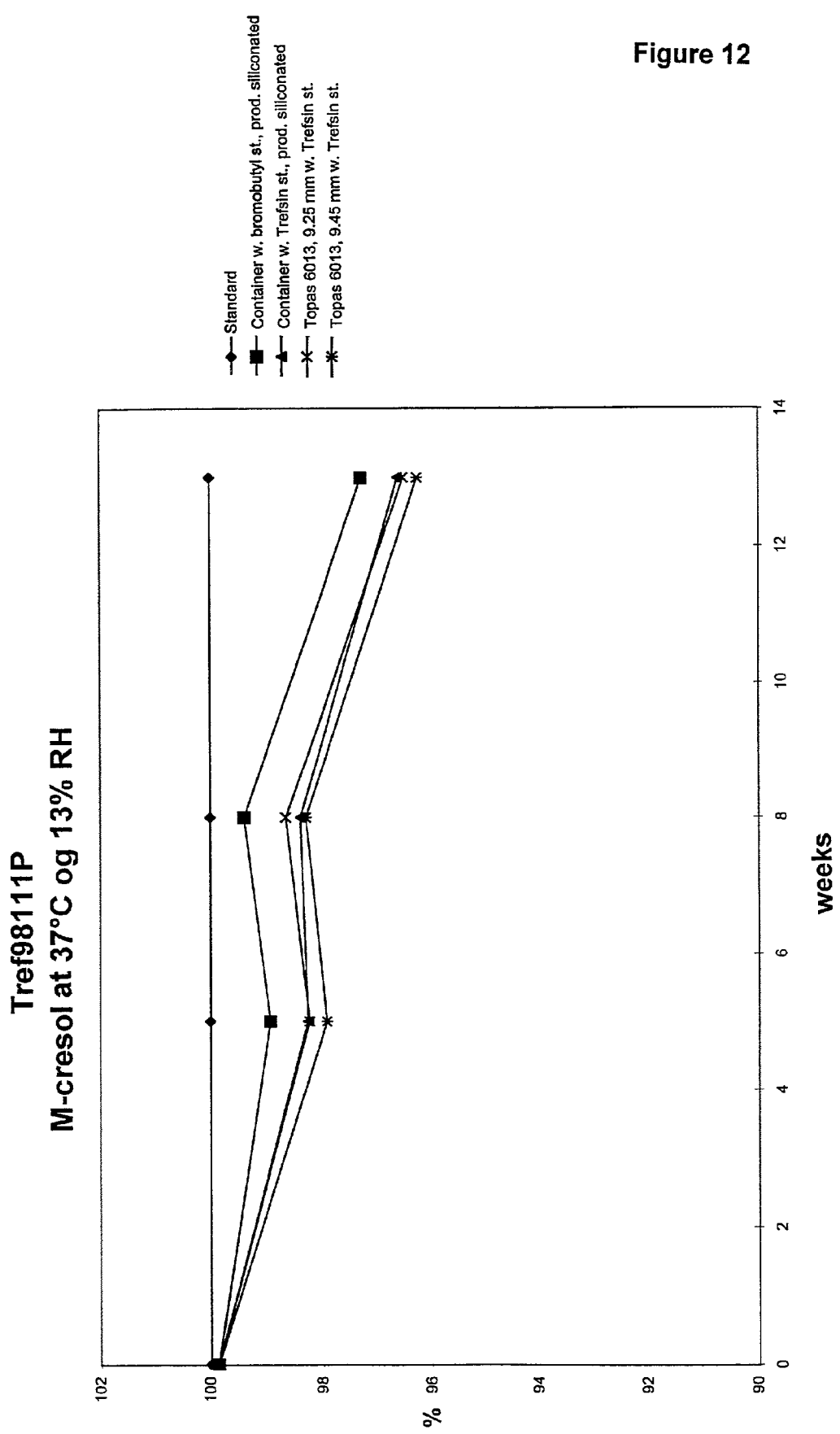

FIG. 12 shows the content of m-cresol in the medical solution over time after storage in a medical container selected from a container with a bromobutyl rubber stopper, a container with a Trefsin® stopper (both siliconised), a Topas® 6013, a 9.25 mm container having a Trefsin® stopper and Topas® 6013, a 9.45 mm container having a Trefsin® stopper. The Trefsin® was a Shore 75A.

Figure 13:
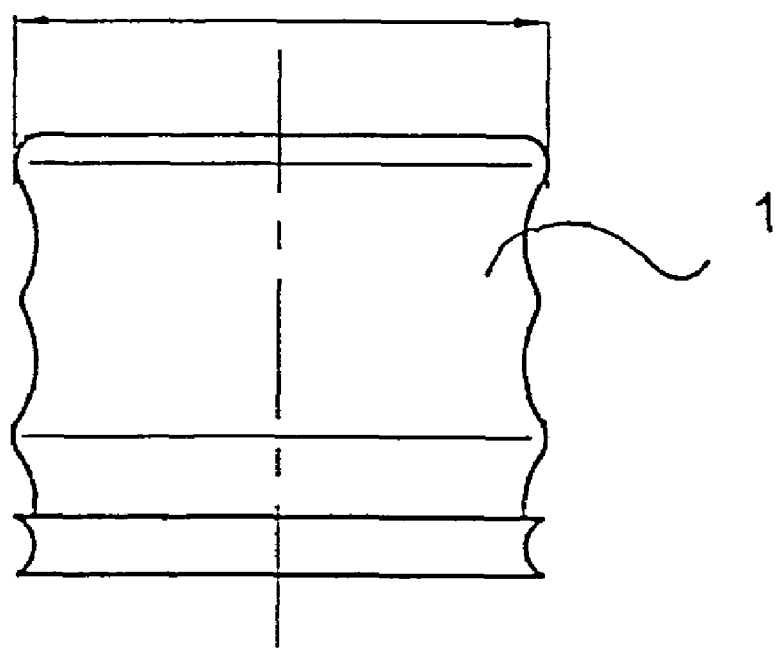

FIG. 13 depicts a potential representation of a stopper according to the invention. (1) is the rubber end of the stopper to be inserted in a medical container.

DETAILED DESCRIPTION OF THE INVENTION

The present invention relates to stoppers for medical containers having superior leakage, tightening and barrier properties. The stopper material described in the present invention has much to the surprise of the inventors proved to have noticeable advantages as a material for the use in pharmaceutical storage when compared to the prior art. The inventors have found that a particular combination of two stopper components surprisingly enhances the reduction of leakage of substances from the material into the solution.

Accordingly, the present invention relates to a stopper comprising a butyl based rubber and another stopper component, wherein the combination of the butyl based rubber and the other stopper component results in a reduced leakage of substances compared to the leakage of substances from a stopper made from a butyl based rubber alone.

The Butyl rubber may be any conventionally used butyl rubber, such as halogenated butyl rubber, for example bromobutyl or chlorobutyl rubber.

In a preferred embodiment of the invention the butyl based rubber is at least partially cross-linked, substantially completely cross-linked. By the term partially cross-linked is meant a rubber being more than 50% and less than 95% cross-linked. A rubber is substantially completely cross-linked when it is equal to or more than 95% crosslinked.

In a cross-linked butyl rubber the polymeric molecules are chemically made to connect in such a way as to provide for a network structure, wherein the macromolecule is three dimensionally cross-linked. Depending on the network structure the rubber may be of a more or less flexible structure.

The other stopper component is preferably a polymer, such as a thermoplastic polymer. The thermoplastic polymer may be selected from the group of polyolefines consisting of polypropylene and polyethylene.

A thermoplastic polymer is a polymer characterised by the reversible physical change of the material as a function of the temperature. The level of the glass transition temperature (Tg) compared to the level of the application temperature is of great importance in relation to the industrial applications and technical properties of the thermoplastic polymer. The main part of the material consists of an amorph structure having a glass transition temperature (Tg) lower than the application temperature, whereby the material appears rubber-elastically. A smaller part of the material appears as an amorph slightly crystalline structure with a Tg value higher than the application temperature. This combination comprises a material according to the invention having the deformation properties and thermoplastic manufacture properties.

The two stopper components of the present invention are morphological interrelated. The term morphological interrelated defines the physical relationship between the two components in the composite, namely the butyl based rubber and another stopper component.

The structure of the present stopper material may be an interpenetrating network. An interpenetrating network is a blend of two components on the molecular level. Each component forms a connected structure throughout the stopper material.

The stopper material of the present invention may also contain additives in an amount not exceeding 1% by weight of the total material. In a preferred embodiment of the invention the amount of additives is less than 0.1% by weight.

Different additives serve different purposes for the improvement or modification of the processing and application technical properties of the material. The additives may be selected from the group of commercially available (Ciba) antioxidants and processing stabilizers, such as Irganox 1010, Irganox 3114 and Irgafos 168, clarifying agents, light stabilizers, UV absorbers, antistatic agents, antimicrobial agents and whitening agents.

The stopper material may also contain conventional fillers, such as carbon black, clay, talc and white carbon. Fillers may be added to the stopper material for reinforcing purposes and may be applied individually or in combination. The preferred proportion of fillers to the stopper material is less than 10% by weight, more preferably less than 5% by weight and most preferably less than 1% by weight.

The stopper material of the present invention may be used for any container storing a solution. The stopper material may be used for containers holding any type of solution. However the type of container that the stopper material may be used for include but is not limited to a medical container. According to the invention a preferred embodiment of the medical container is for holding a liquid medicament solution, such as insulin or growth hormone.

In one embodiment of the present invention the medical container for storing a liquid medicament, comprises a distal and a proximal end portion and at least one wall defining an interior space for such liquid medicament, wherein one of the end portions comprises a stopper as defined by the invention.

In yet another embodiment the medical container has at least one wall that is non-flexible.

It is of great importance to prevent substances leaking from the stopper material into the medical solution. The inventors of the present invention have surprisingly found that by using the present stopper material the leakage is reduced. This provides for the secure and long time storage of medical solutions.

It is the object of the present invention to reduce the leakage of substances by combining a butyl based rubber with another stopper component.

According to the present invention the stopper for a medical container comprises an injection-mouldable material made of a blend of 10-30% by weight of a thermoplastic polymer and 70-90% by weight of a butyl based rubber.

In a more preferred embodiment the stopper material is made of a blend of 13-25% by weight of a thermoplastic polymer and 75-87% by weight of a butyl based rubber.

In a less preferred embodiment the stopper material is a thermoplastic elastomer selected from the groups consisting of 1,2-polybutadiene, styrene-based elastomers and polyester elastomers. However, the amount of substances leaking into the medical solution from these types of elastomers exceeds the amount of substances leaking into the medical solution from the most preferred stopper material described by the present invention.

The storage of liquid medicaments in medical containers requires the presence of at least one preservative, such as m-cresol. Other preservatives that may be used are phenol or benzyl alcohol.

When the blend according to the invention is used as a stopper material the m-cresol and water passage into the stopper is of almost identical size as the m-cresol and water passage into a stopper made from butyl based rubber alone. The m-cresol barrier of the stopper material of the present invention is thus surprisingly good since it would be expected that a blend of polyolefin and bytyl based rubber would drastically reduce the barrier properties to m-cresol and water compared to those of conventional butyl based rubber alone. However, this is not the case and thus it seems that the chemical tightness of the stopper material is at least the same as the chemical tightness of the conventional material.

It is a general belief that the mechanical sealing between two materials of different hardness being in physical contact, such as the connection between a stopper and a container, is increased, the softer one of the materials is with respect to the other material. Judging from this correlation, it may be assumed that the stopper material of the present invention has reduced mechanical sealing when compared to butyl based rubber alone, this being due to the harder nature of the stopper material of the present invention. However, this is in fact not the case. Contrary to common belief the inventors have surprisingly found that the stopper described in the invention, though being of a harder material than a butyl based stopper material, possesses sealing properties superior to the prior art. This in fact is a crucial feature of the present invention.

To achieve a stopper having good mechanical sealing properties the degree of hardness of the stopper material must be considered. The hardness of a stopper material is correlated to the success of the mechanical sealing and vice versa. The hardness may be expressed in Shore units. The Shore value is determined by measuring the depth of penetration when leading a standard cone shaped object into the material with a predefined force. The results from the rubber measurements are expressed in different Shore degree values, such as Shore A or Shore D.

In a preferred embodiment the stopper according to the present invention has a hardness of 40-80 Shore A. More preferably the stopper according to the present invention has a hardness of 45-75 Shore A, and most preferably the stopper has a hardness of 65-75 Shore A.

For comparison butyl based rubber used typically for stoppers has a hardness of 45-50 Shore A. It is thus a softer material than the stopper material of the invention but does surprisingly not as described above have better tightness properties than the present stopper material.

The stopper of the present invention may have any suitable shape depending on the use of the stopper, and in one embodiment the stopper has a substantially circular cross-section, such as the shape of an O-ring.

Independant of the shape, the stopper according to the invention is capable of gliding longitudinally inside a medical container by applying force to the stopper. The applied force to the stopper may be through a rod, for example by pressing the rod by hand.

One aspect of the invention concerns a process of producing a stopper, comprising the following steps of:
heating a butyl based rubber and melting a thermoplastic polymer,
homogenising the stopper material,
moulding the stopper material by injection moulding and obtaining the stopper.

Before the moulding process commences the stopper components are blended and homogenised. It is speculated that due to the way in which the initial blending and in particular the homogenising procedures are carried out, a superior material for the use in the present invention is obtained.

The stopper material is hereby moulded by injection-moulding. The advantages of the injection-moulding process are the reduced time needed to form a particular product and that the injection-moulding process provides for an increased variety range of shapes and forms of the product in question. The injection-moulding process is reversible as opposed to processing a material by vulcanisation, wherein the material is transformed from a thermoplastic material to a thermoset material having elastic properties. A further benefit of using the composition according to the invention is that it is recyclable. The material may be reused during the production process, by heating the material followed by moulding. This present obvious environmental benefits.

Finally obtained is a moulded stopper for the further application in pharmaceutical packaging, such as in syringes or medical containers for holding liquid solutions, in particular medical containers for the long term storage of liquid solutions.

For many purposes of using the stopper according to the invention the stopper is preferably attached to a rod. Accordingly, in one embodiment of the present invention the stopper is moulded on to a rod by the means of two-component injection moulding.

EXPERIMENTALS

The following is a description of the experiments performed to determine the m-cresol barrier and the tightness and leakage properties of the present invention.

Determination of Tightness and m-cresol Barrier

The tightness property of the stopper material was examined as the diffusion of water and m-cresol from the medical solution over time. The diffusion was expressed as water loss and as the amount of m-cresol retained in the medical solution over time.

Insulin was stored in various containers having stoppers made from different materials. The storage period was up to 13 weeks at 37° C., 13% RH. After storage the insulin solution was measured for water and m-cresol contents.

Materials and Methods:

For the experiments a stopper material of polypropylene and bromobutyl rubber, Trefsin® were used as a stopper according to the invention. For comparative testing a conventional bromobutyl rubber stopper were used.

The containers selected were container with a bromobutyl rubber stopper, container with a Trefsin® stopper (both siliconised), Topas® 6013, a 9.25 mm having a Trefsin® stopper and Topase 6013, a 9.45 mm having a Trefsin® stopper.

The Trefsin® stoppers were either 65A shore or 75A shore.

Insulin formula: Actrapid HM(ge), 100 i.u/ml, injection solution, container.

Plastic Materials:

Topas® 6013, 9.25 mm

Topas® 6013, 9.45 mm

| Insulin formula: | |
|---|---|
| Insulin Human HM(ge) | 100 i.u. |
| Glycerol | 16 mg |
| m-cresol* | 3 mg |
| Zinc (as $ZnCl_2$) | 7 µg |
| NaOH** | q.s. |
| HCl** | q.s. |
| Water for the injection solution ad | 1 ml |

*m-cresol is added in a abundance of 5% to compensate for loss during production.
**pH adjustment The production and storage of the test material:

Insulin formula: Actrapid HM(ge), 100 i.u/ml in 10 ml vials were kept at 4° C. until use.

Filling and storage of containers: The stopper was siliconised on the surface. The stopper was placed in a container, and the containers were filled with Actrapid from a sterile disposable syringe, for example 20 ml. The containers were placed at room temperature and weighed and then transferred to an Heraeus incubator.

Methods of Analysis

During the stability studies the containers were kept at 37° C., and at a humidity of 13% RH (Heraeus incubator, HC 2020) and analysed according to the methods and within the limits shown in table 1.

TABLE 1

| Analysis and outflow limits at 37° C. | | |
|---|---|---|
| Analysis: | Method: | Outflow limit: |
| M-cresol | HPLC | 2.7-3.3 mg/ml |
| Water diffusion | Weighing | 1% |

For the m-cresol measurements Actrapid kept at −20° C. were used as a standard in the HPLC analysis.

The m-cresol and water loss tests for the four different medical stopper/materials are shown in Table 2.

TABLE 2

| Time of storage (weeks, months) | Number of plastic container samples |
|---|---|
| 0 | 0 |
| 2 | |
| 4 | 3 |
| 6 | |
| 8 | 3 |
| 10 | |
| 13, 3 | 3 |

Table 2 shows the number of containers that were analysed per stopper/container material after storing for various lengths.

The number of containers chosen are for statistical and reproducable purposes.

TABLE 3

| Stopper material | Number of medical containers used for testing |
|---|---|
| Container with bromobutyl stopper, siliconised | 12 |
| Container with Trefsin ® stopper, siliconised | 12 |
| Topas ® 6013, a 9.25 mm with Trefsin ® stopper | 12 |
| Topas ® 6013, a 9.25 mm with Trefsin ® stopper | 12 |

Table 3 shows the number of medical containers of different materials used for testing.

Figure 1:
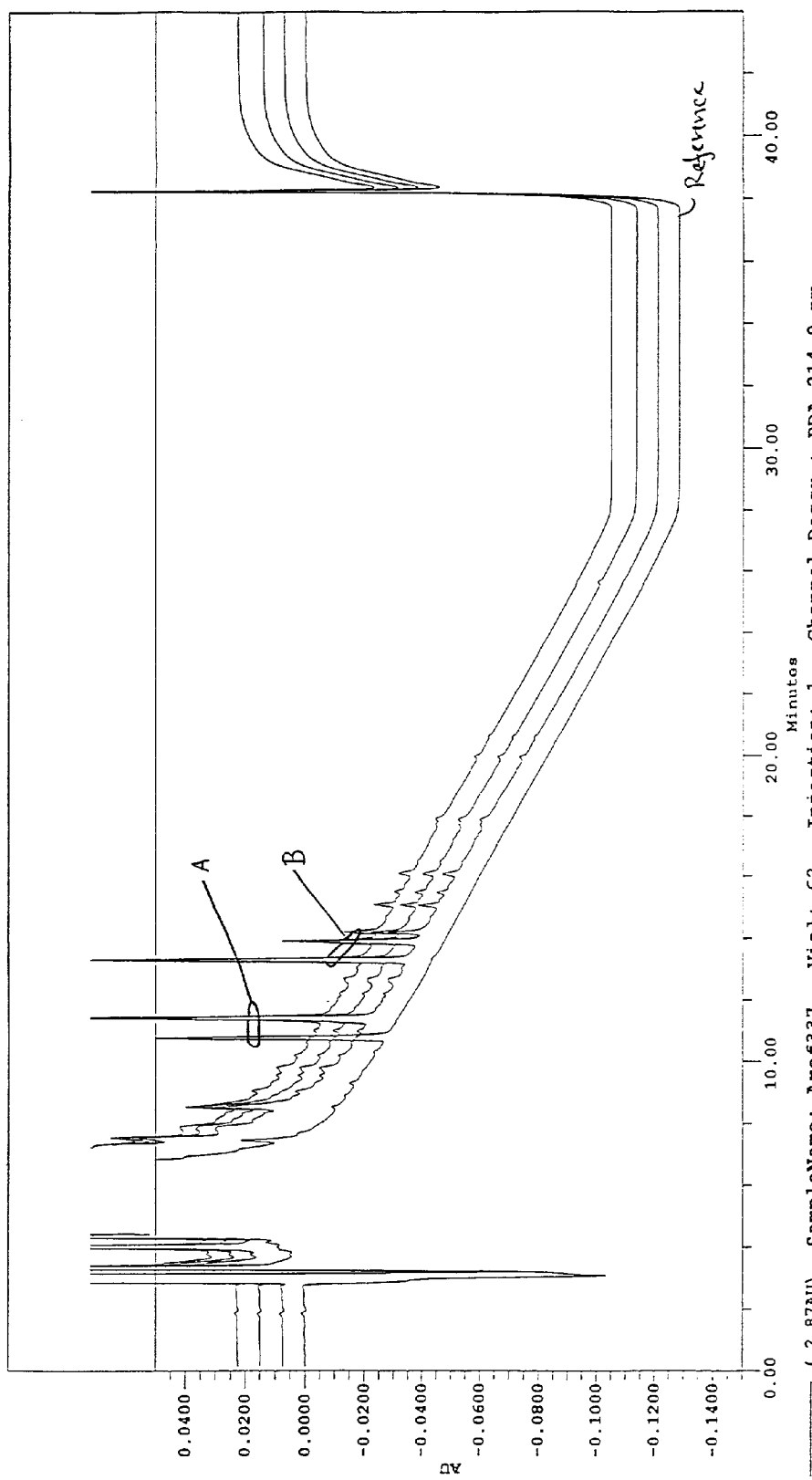
Figure 2:
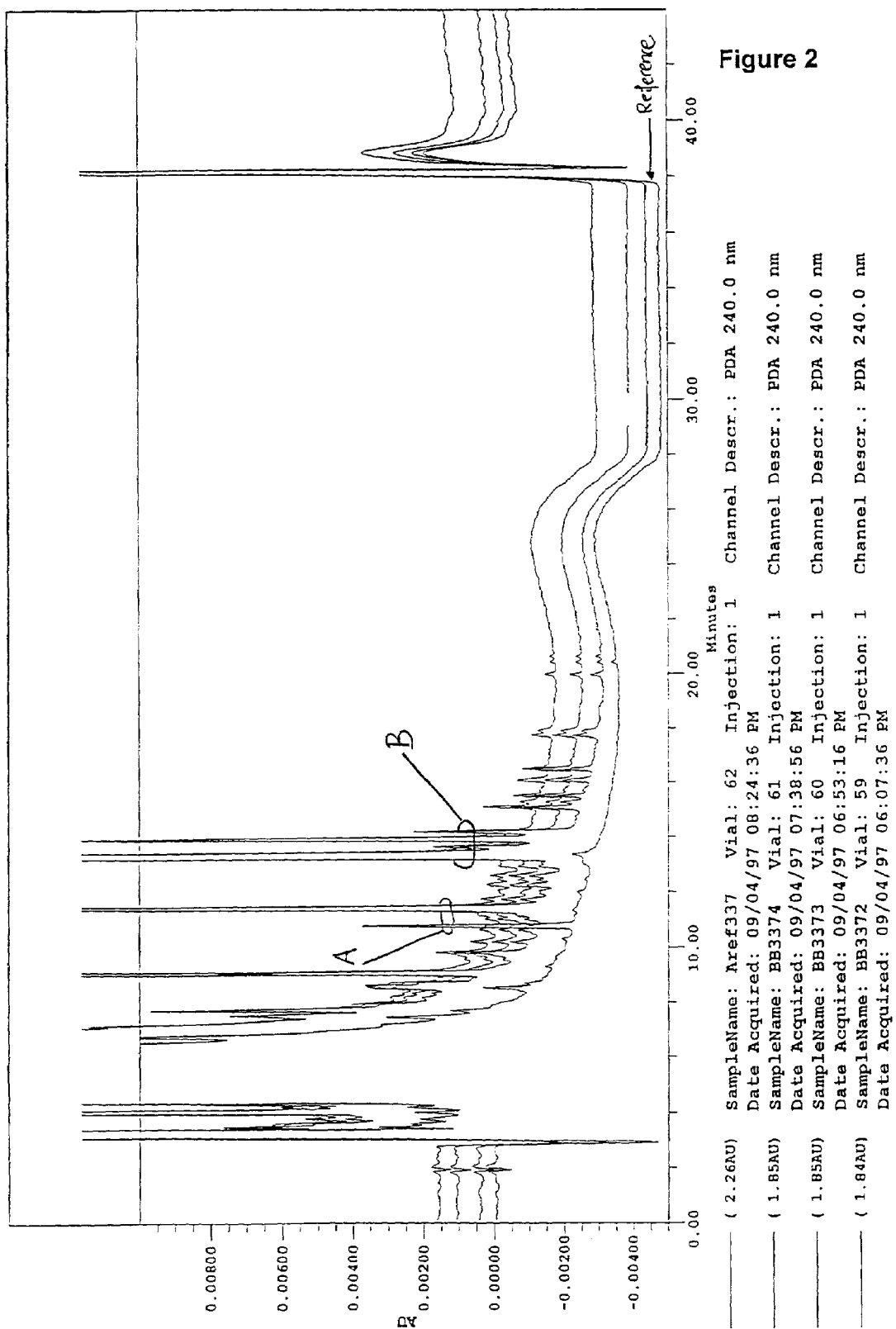
Figure 3:
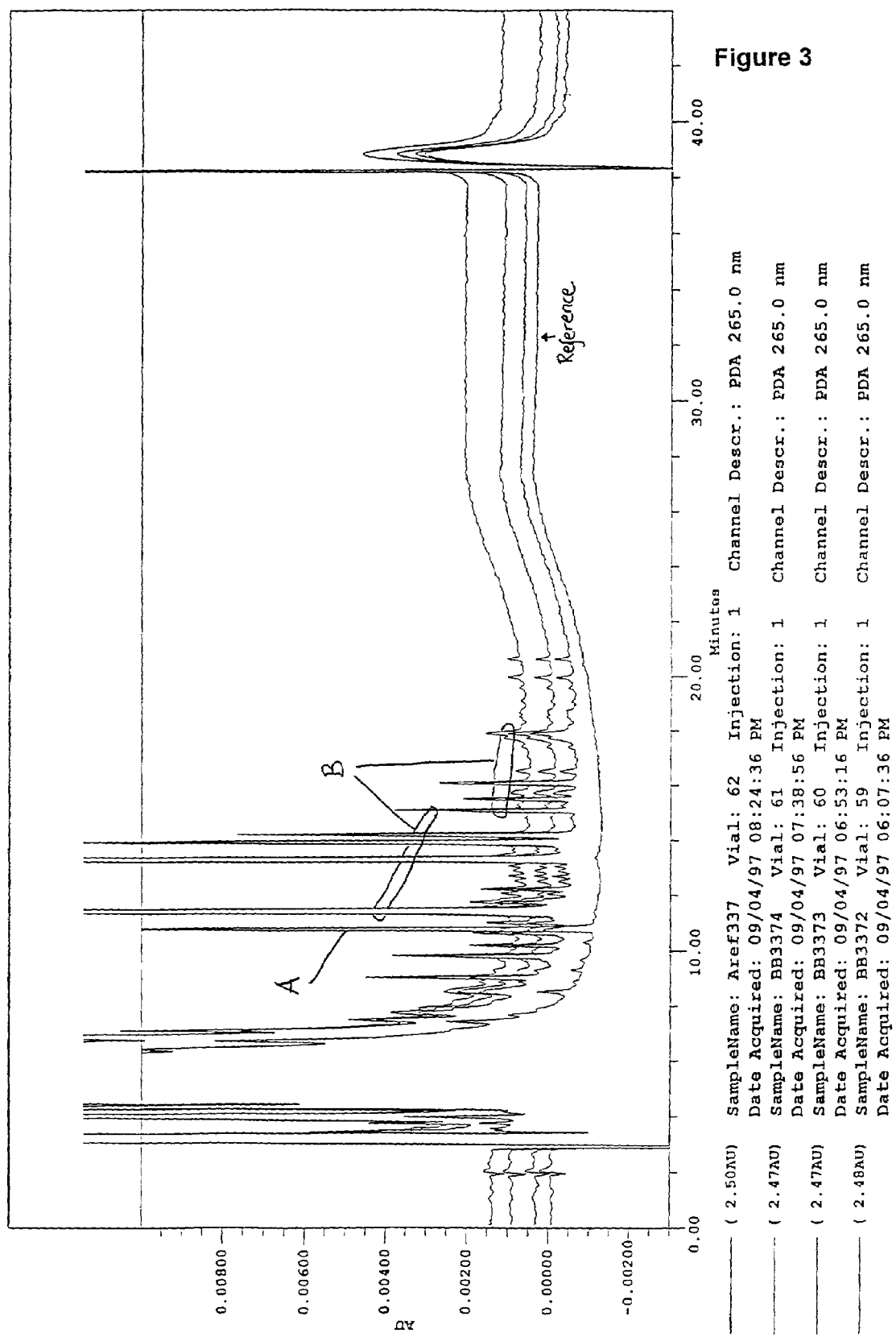
Figure 4:
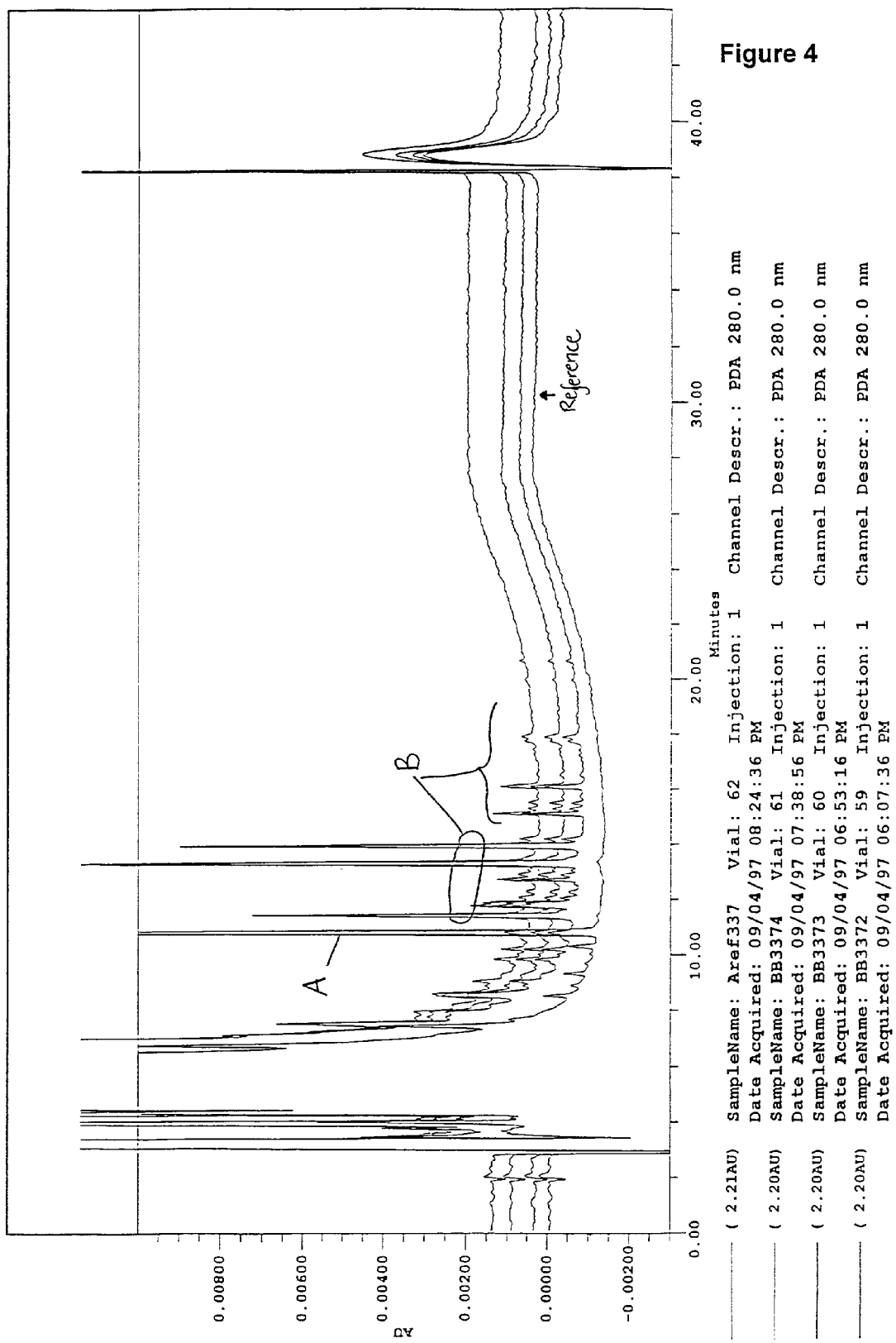
Figure 5:
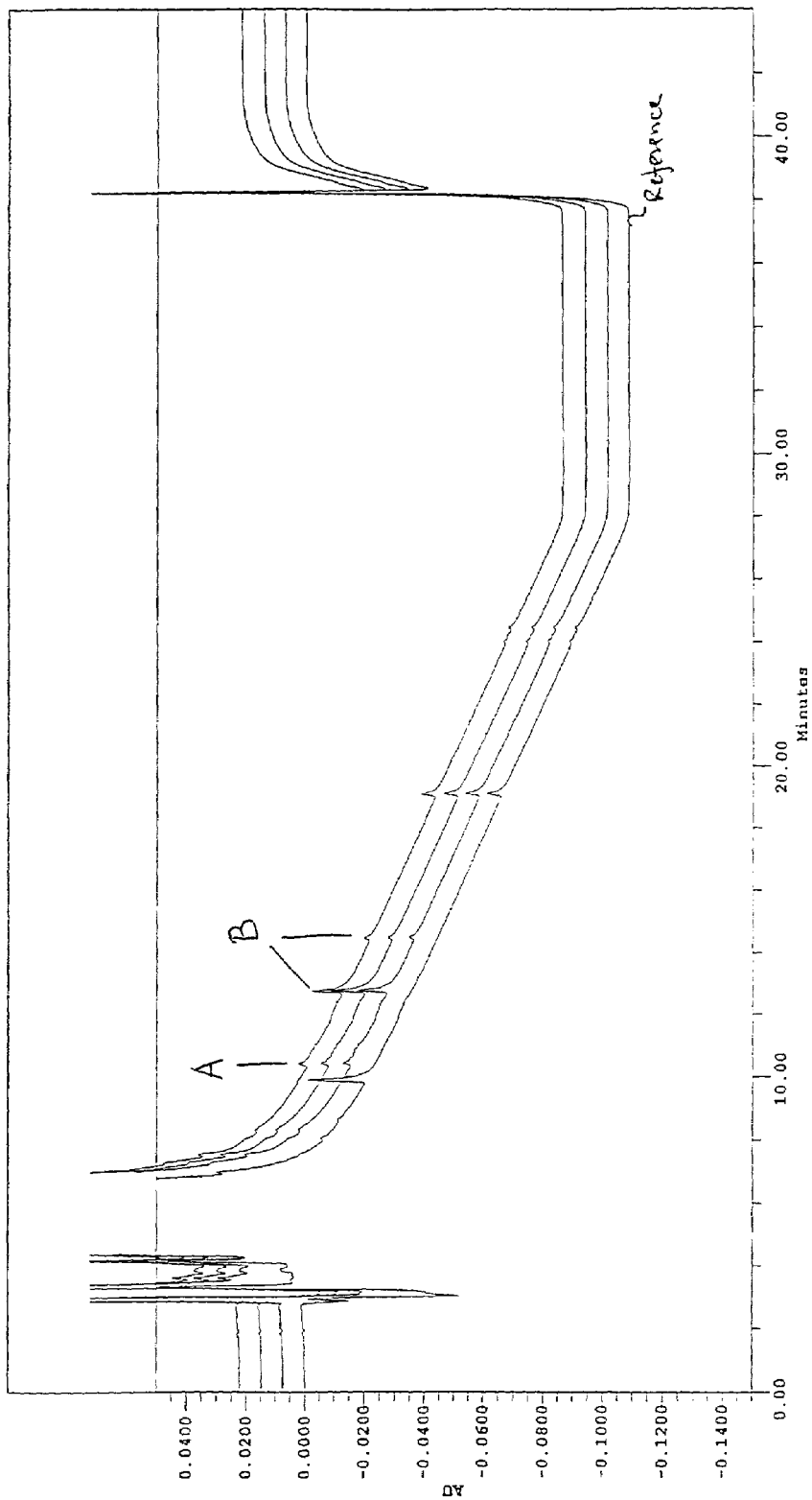
Figure 6:
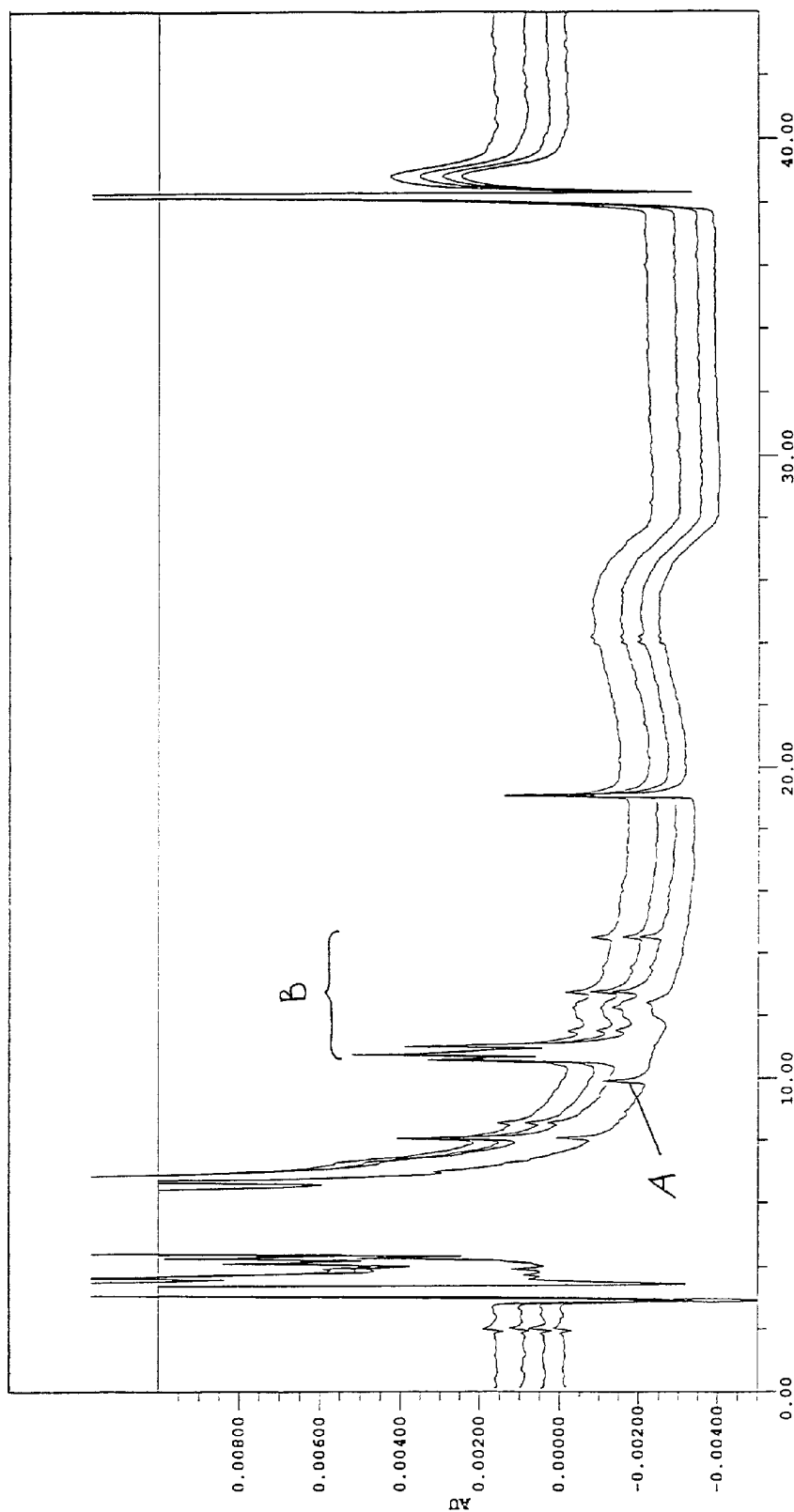
Figure 7:
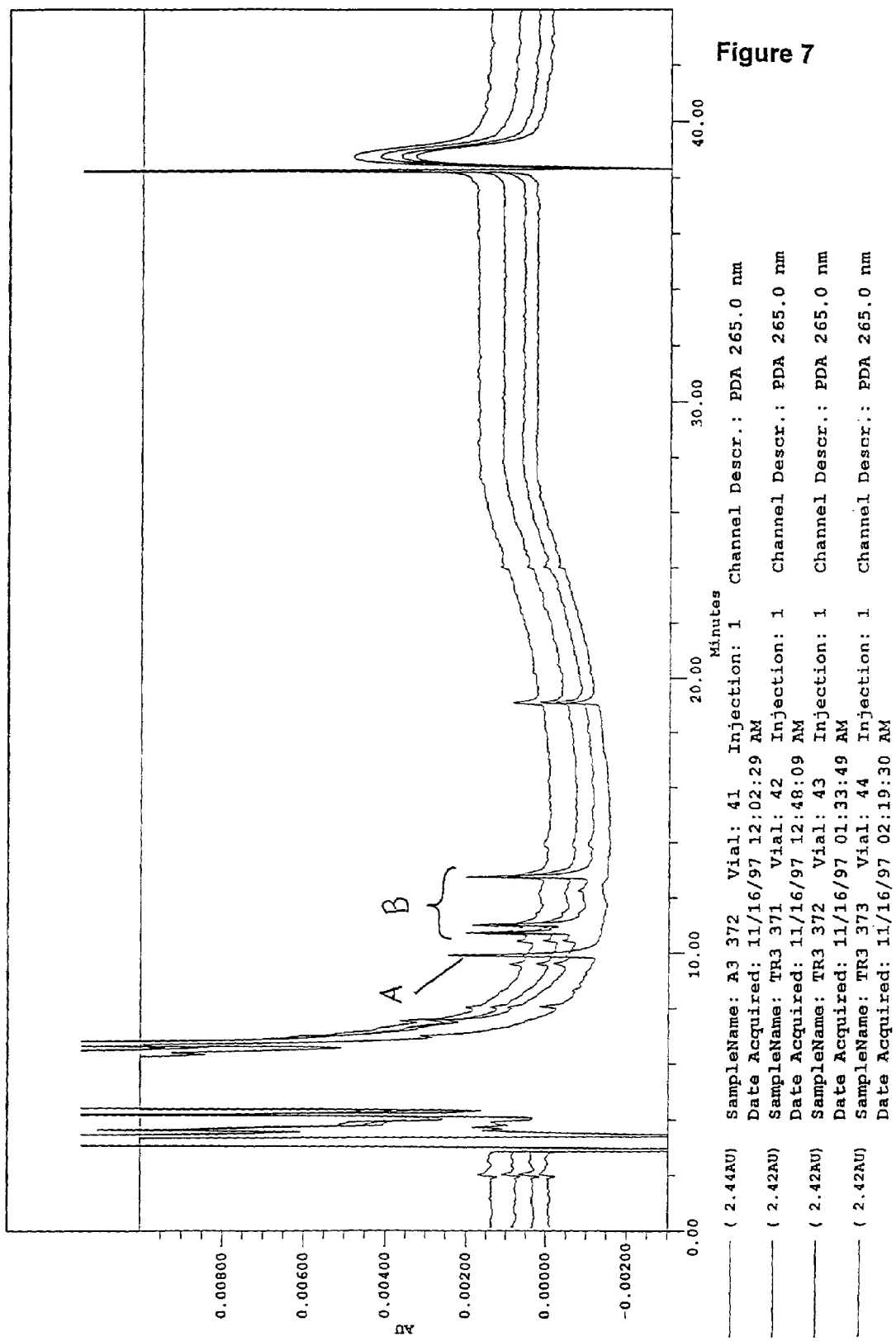
Figure 8:
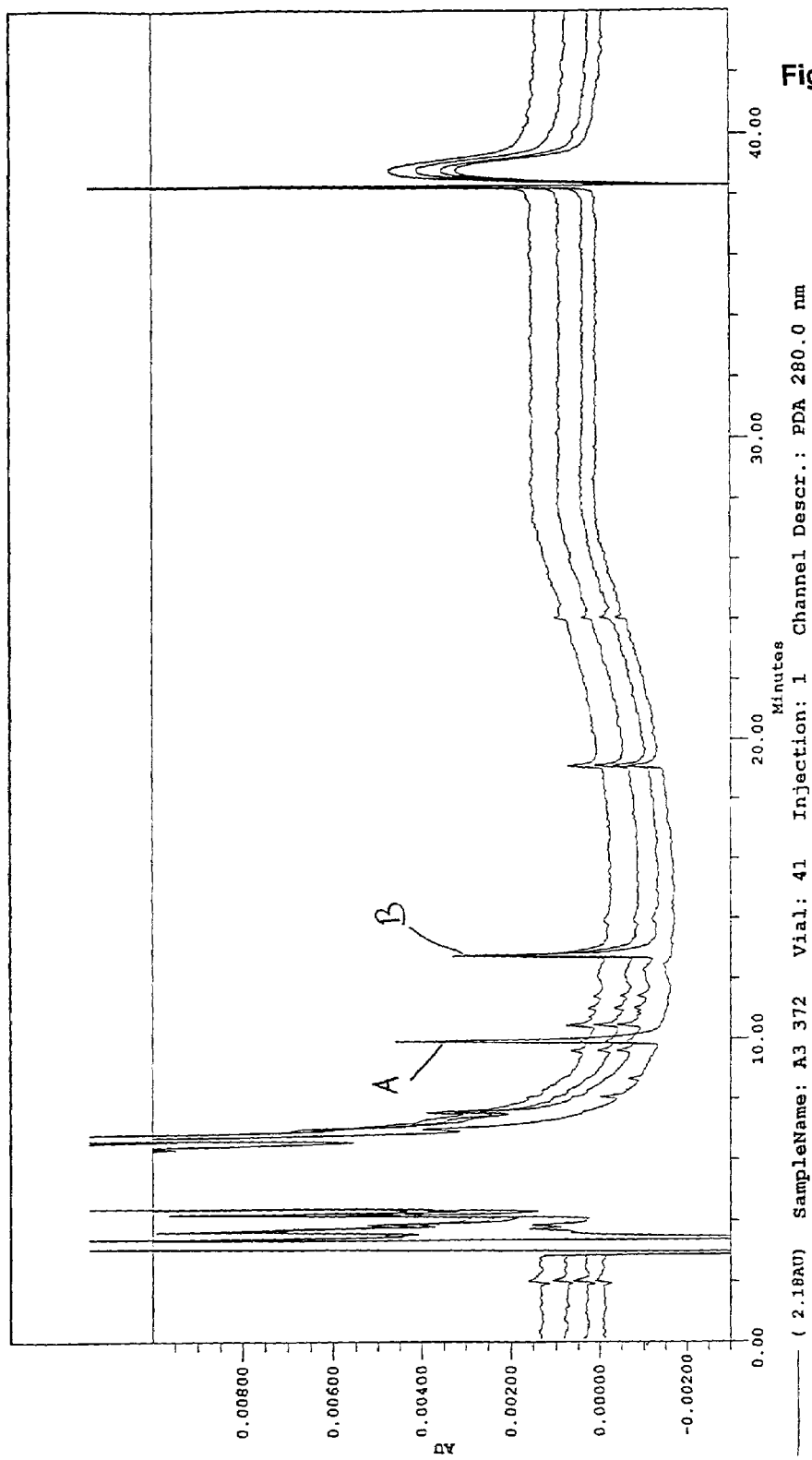
Figure 9:
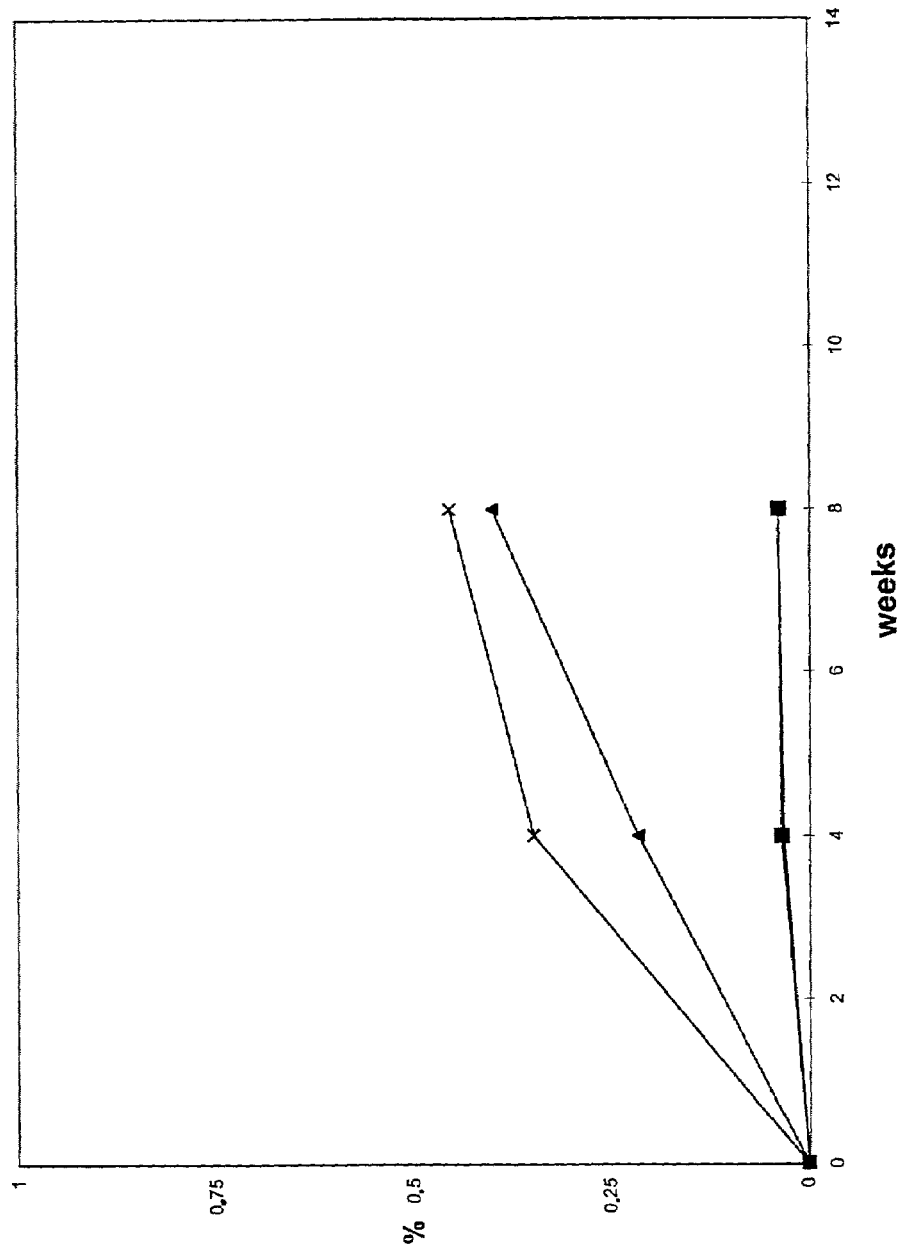
FIG. 9 shows the water loss over time from the medical containers selected from a container with a bromobutyl rubber stopper, a container with a Trefsin® stopper (both siliconised), a Topas® 6013, a 9.25 mm container having a Trefsin® stopper and Topas® 6013, a 9.45 mm container having a Trefsin® stopper. The Trefsin® was a Shore 65A.
Figure 10:
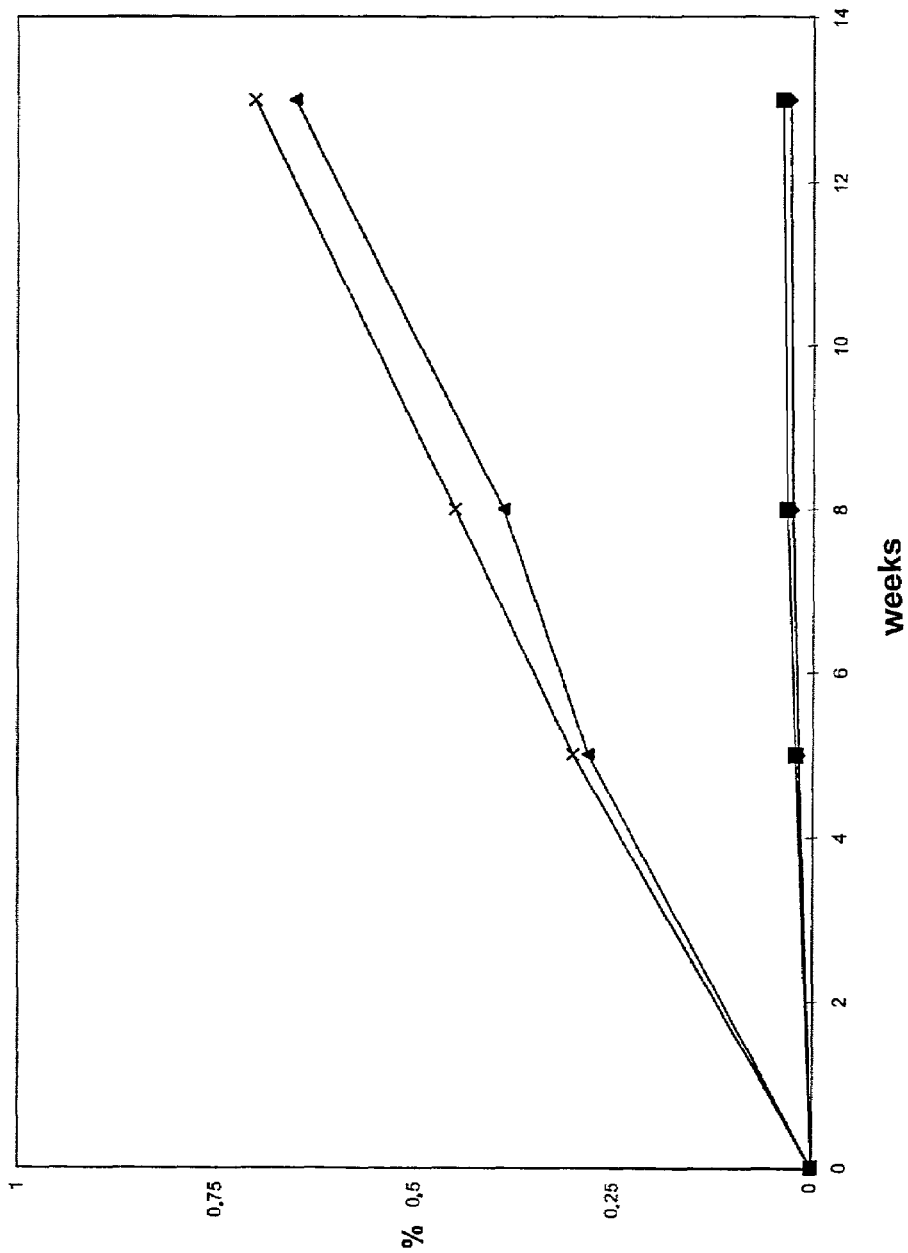
FIG. 10 shows the water loss over time from the medical containers selected from a container with a bromobutyl rubber stopper, a container with a Trefsin® stopper (both siliconised), a Topas® 6013, a 9.25 mm container having a Trefsin® stopper and Topas® 6013, a 9.45 mm container having a Trefsin® stopper. The stopper material according to the invention was a Shore 75A.

As depicted in FIG. 9 and FIG. 10 the water loss for all four test objects increased with time but were below 1%. When comparing the water loss from a container having a 65A Trefsin® stopper with a container having a conventional bromobutyl rubber stopper the difference is non significant (FIG. 9). The same is the case for the water loss difference between a container having a 75A Trefsin® stopper and a container having a conventional bromobutyl rubber stopper (FIG. 10).

Figure 11:
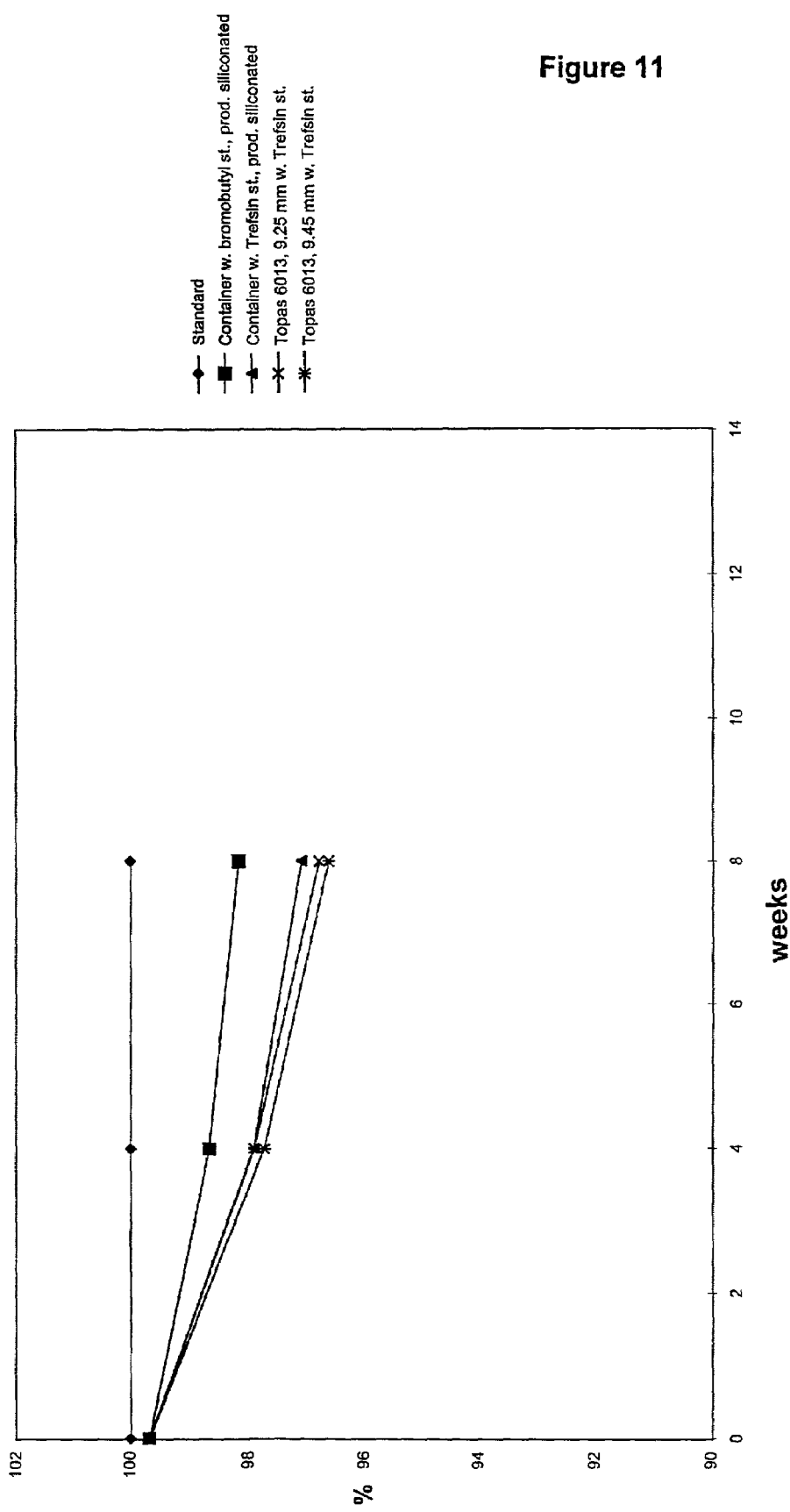
FIG. 11 shows the content of m-cresol in the medical solution over time after storage in a medical container selected from a container with a bromobutyl rubber stopper, a container with a Trefsin® stopper (both siliconised), a Topas® 6013, a 9.25 mm container having a Trefsin® stopper and Topas® 6013, a 9.45 mm container having a Trefsin® stopper. The Trefsin® was a Shore 65A.

In FIG. 11 and FIG. 12 the containers with a Trefsin® stopper of Shore 65A and 75A respectively, show a slight decrease in the barrier against m-cresol when compared to a container having a conventional bromobutyl rubber stopper.

Determination of the Leakage Property

To test the leakage property of the stopper material according to the invention insulin formula samples were stored in containers having either a bromobutyl based rubber stopper or a Trefsin® stopper. The samples were stored at 37° C. for 3 months prior to analysis.

The principle behind the detection of leakage substances in the insulin formula is the method of RP-HPLC (Reverse Phase-High Performance Liquid Chromatography) having a protein C4 column. This method is capable of analysing a steep gradient of solvents ranging from weakly aqueous to pure organic. This ensures a broad screening for hydrofobic leakage substances. Triflouro acetic acid (0.05%), 90% acetonitril in water and 0.0015% Triflouro acetic acid in acetonitril were used as solvents for the eluation.

After passing through the RP-HPLC column the samples were analysed in a PDA-detector (Photo Diode Array) at a broad range of wavelengths. This was done to secure the registration of potential unknown leakage substances having unknown absorption spectras. The wavelengths were limited to the interval of 200-300 nm.

In FIG. 1-FIG. 4 the chromatograms illustrate the results from the "Bromobutyl rubber" stopper experiments at various wavelengths.

FIG. 5-FIG. 10 illustrate the results from the "Trefsin®" stopper experiments at various wavelengths.

When these two groups are compared at any given wavelength it is evident that the quantitative amount of leakage substances in the insulin solution is significantly reduced when a Trefsin® stopper has been employed. There are fewer substances leaking from a Trefsin® stopper than from a Bromobutyl rubber stopper at all the examined wavelengths (see the depicted A and B peaks on the figures). This illustrate the scope of the present invention providing a stopper material made from butyl based rubber and a thermoplastic polymer significantly reducing the amount of leakage substances from the stopper into the medical solution, and thus makes an excellent candidate for the use in pharmaceutical packaging.

The invention claimed is:

1. A stopper comprising an injection-mouldable material, comprising:
   a blend of a butyl based rubber present in an amount of 70-90% by weight,
   a polyolefin present in an amount of 30-10% by weight, and
   a combination of fillers and additives present in an amount of 11% by weight or less, wherein the combination of fillers and additives comprises 10% by weight or less of fillers, and 1% by weight or less of additives,
   wherein the combination of the butyl based rubber and the polyolefin results in a reduced leakage of substances compared to the leakage of substances from a stopper made from a butyl based rubber alone, and wherein the stopper has a hardness of 65-75 Shore A.

2. The stopper according to claim 1 for a medical container, comprising a blend of 13-25% by weight of a polyolefin and 75-87% by weight of a butyl based rubber.

3. The stopper according to claim 1, wherein the polyolefin is selected from the group of polyolefines consisting of polypropylene and polyethylene.

4. The stopper claim 1, wherein the butyl based rubber is halogenated butyl.

5. The stopper claim 1, wherein the butyl based rubber is a bromobutyl.

6. The stopper according to claim 1, wherein the butyl based rubber is at least partially cross-linked.

7. The stopper according to claim 1 wherein the stopper has a substantially circular cross-section.

8. The medical container according to claim 7, wherein the at least one wall is non-flexible.

9. A medical liquid medicament storage container comprising a distal and a proximal end portion and at least one wall defining an interior space for such liquid medicament, wherein one of the end portions comprises a stopper comprising:
   an injection-mouldable material comprising:
   a blend of butyl based rubber present in an amount of 70-90% by weight,
   a polyolefin present in an amount of 30-10% by weight, and
   a combination of fillers and additives present in an amount of 11% by weight or less, wherein the combination of fillers and additives comprises 10% by weight or less of fillers and 1% by weight or less of additives,
   wherein the combination of the butyl based rubber and the polyolefin results in a reduced leakage of substances compared to the leakage of substances from a stopper made from a butyl based rubber alone, and wherein the stopper has a hardness of 65-75 Shore A.

10. A stopper comprising an injection-mouldable material, consisting essentially of:
    a blend of a butyl based rubber present in an amount of 70-90% by weight, and a polyolefin, and
    optionally a combination of fillers and additives present in an amount of 11% by weight or less, wherein in the combination of fillers and additives, additives are optionally present in an amount not exceeding 1% by weight, and fillers are optionally present in an amount less than 10% by weight, and wherein the balance of the material is polyolefin, and
    wherein the combination of the butyl based rubber and the polyolefin results in a reduced leakage of substances compared to the leakage of substances from a stopper made from a butyl based rubber alone, and wherein the stopper has a hardness of 65-75 Shore A.

11. The stopper according to claim 10 for a medical container, wherein the injection-mouldable material, consists essentially of: a blend of 13-25% by weight of a polyolefin and 75-87% by weight of a butyl based rubber.

12. The stopper according to claim 10, wherein the polyolefin is selected from the group of polyolefines consisting of polypropylene and polyethylene.

13. The stopper claim 10, wherein the butyl based rubber is halogenated butyl.

14. The stopper claim 10, wherein the butyl based rubber is a bromobutyl.

15. The stopper according to claim 10, wherein the butyl based rubber is at least partially cross-linked.

16. The stopper according to claim 10 wherein the stopper has a substantially circular cross-section.

* * * * *